United States Patent
Urano et al.

(10) Patent No.: US 11,713,054 B2
(45) Date of Patent: Aug. 1, 2023

(54) AUTONOMOUS DRIVING DEVICE AND AUTONOMOUS DRIVING CONTROL METHOD THAT DISPLAYS THE FOLLOWING ROAD TRAVELING ROUTE

(71) Applicant: TOYOTA JIDOSHA KABUSHIKI KAISHA, Toyota (JP)

(72) Inventors: Hiromitsu Urano, Numazu (JP); Bunyo Okumura, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/407,895

(22) Filed: Aug. 20, 2021

(65) Prior Publication Data

US 2021/0380124 A1 Dec. 9, 2021

Related U.S. Application Data

(63) Continuation of application No. 16/840,884, filed on Apr. 6, 2020, now Pat. No. 11,124,203, which is a
(Continued)

(30) Foreign Application Priority Data

Dec. 6, 2016 (JP) .................................. 2016-236663

(51) Int. Cl.
*B60W 50/14* (2020.01)
*B60Q 1/46* (2006.01)
(Continued)

(52) U.S. Cl.
CPC .............. *B60W 50/14* (2013.01); *B60Q 1/46* (2013.01); *B60W 50/10* (2013.01);
(Continued)

(58) Field of Classification Search
CPC .............. B60W 50/14; B60W 50/10; B60W 2050/146; B60W 2720/10; B60Q 1/46;
(Continued)

(56) References Cited

U.S. PATENT DOCUMENTS 8,676,431 B1   3/2014 Mariet et al.
10,654,490 B2  5/2020 Urano
(Continued)

FOREIGN PATENT DOCUMENTS

JP   2003-021527 A   1/2003
JP   2008114778 A    5/2008
(Continued)

OTHER PUBLICATIONS

Urano, Hiromitsu et al., U.S. Appl. No. 15/810,887, filed Nov. 8, 2017.
(Continued)

*Primary Examiner* — Russell Frejd
*Assistant Examiner* — Ana D Thomas
(74) *Attorney, Agent, or Firm* — Sughrue Mion, PLLC

(57) ABSTRACT

An autonomous driving device is configured to switch a driving mode, and includes a destination setting type autonomous driving mode in which a vehicle is made to travel to a destination and a following road autonomous driving mode in which, when a destination is not set, the vehicle is made to travel along a road. The autonomous driving device includes a display unit and an electronic control unit. The electronic control unit is configured to, when the display unit is made to display a traveling route along a following road traveling route, make the display unit display a traveling route from a current position of the vehicle to a nearest branch road in front in a moving direction along the following road traveling route and a moving direction on the nearest branch road along the following road traveling route.

14 Claims, 3 Drawing Sheets

Related U.S. Application Data continuation of application No. 15/810,887, filed on Nov. 13, 2017, now Pat. No. 10,654,490.

(51) Int. Cl.
  *B60W 50/10* (2012.01)
  *G01C 21/34* (2006.01)
  *G01C 21/36* (2006.01)
  *G05D 1/02* (2020.01)
  *B60K 28/06* (2006.01)

(52) U.S. Cl.
  CPC ..... *G01C 21/3415* (2013.01); *G01C 21/3617* (2013.01); *G05D 1/0214* (2013.01); *B60K 28/06* (2013.01); *B60W 2050/146* (2013.01); *B60W 2720/10* (2013.01); *G05D 1/021* (2013.01)

(58) Field of Classification Search
  CPC ............ G01C 21/3415; G01C 21/3617; G05D 1/0214; G05D 1/021; B60K 28/06
  See application file for complete search history.

(56) References Cited

U.S. PATENT DOCUMENTS

| | | |
|---|---|---|
| 2013/0110343 A1 | 5/2013 | Ichikawa et al. |
| 2017/0193627 A1 | 7/2017 | Urmson et al. |
| 2017/0371334 A1 | 12/2017 | Nagy et al. |
| 2018/0074497 A1 | 3/2018 | Tsuji et al. |
| 2018/0088572 A1* | 3/2018 | Uchida ............... B60W 50/082 |
| 2018/0136655 A1* | 5/2018 | Kim ................... G05D 1/0088 |
| 2018/0154824 A1 | 6/2018 | Urano |
| 2020/0231174 A1 | 7/2020 | Urano |

FOREIGN PATENT DOCUMENTS

| | | |
|---|---|---|
| JP | 2011-162132 A | 8/2011 |
| WO | 2011158347 A | 12/2011 |

OTHER PUBLICATIONS

Notice of Allowance dated May 26, 2021, which issued during the prosecution of U.S. Appl. No. 16/840,884.

Urano, Hiromitsu et al., U.S. Appl. No. 16/840,884, filed Apr. 6, 2020.

* cited by examiner

AUTONOMOUS DRIVING DEVICE AND AUTONOMOUS DRIVING CONTROL METHOD THAT DISPLAYS THE FOLLOWING ROAD TRAVELING ROUTE

INCORPORATION BY REFERENCE

This application is a continuation of U.S. application Ser. No. 16/840,884 filed Apr. 6, 2020 (allowed), which is a continuation of U.S. application Ser. No. 15/810,887 filed Nov. 13, 2017 (now U.S. Pat. No. 10,654,490 issued May 19, 2020), which claims benefit from Japanese Patent Application No. 2016-236663 filed Dec. 6, 2016. The entire disclosures of the prior applications are considered part of the disclosure of the accompanying continuation application, and are hereby incorporated herein by reference in its entirety.

BACKGROUND

1. Technical Field

The present disclosure relates to an autonomous driving device and an autonomous driving control method.

2. Description of Related Art

For example, WO 2011/158347 describes an autonomous driving device that performs following road autonomous driving control for, in a case where a destination is not set in advance, generating a following road traveling route for traveling along a road, on which a vehicle is traveling, and making the vehicle travel autonomously along the following road traveling route.

SUMMARY

In the autonomous driving device described in WO 2011/158347, in a case where a driving mode of the vehicle is a following road autonomous driving mode in which the following road autonomous driving control is performed, an occupant of the vehicle does not understand how the vehicle travels (in which direction the vehicle moves) on a branch road.

Accordingly, an aspect of the disclosure provides an autonomous driving device and an autonomous driving control method capable of, in a case where a driving mode of a vehicle is a following road autonomous driving mode, allowing an occupant to ascertain how the vehicle travels on a branch road.

A first aspect of the disclosure relates to an autonomous driving device that is configured to switch a driving mode of a vehicle. The driving mode includes a destination setting type autonomous driving mode in which the vehicle is made (controlled) to travel using a traveling plan generated based on a target traveling route to a destination set in advance, and a following road autonomous driving mode in which, when a destination is not set in advance, the vehicle is made (controlled) to travel using a traveling plan generated based on a following road traveling route set along a road, on which the vehicle is traveling. The autonomous driving device includes a display unit configured to present information, and an electronic control unit. The electronic control unit is configured to select, as the driving mode, the destination setting type autonomous driving mode or the following road autonomous driving mode based on a prescribed condition. The electronic control unit is configured to control traveling of the vehicle based on the traveling plan of the selected driving mode. The electronic control unit is configured to make (control) the display unit display a traveling route along the target traveling route when the driving mode is the destination setting type autonomous driving mode, and make the display unit display a traveling route along the following road traveling route when the driving mode is the following road autonomous driving mode. The electronic control unit is configured to, when the display unit is made to display the traveling route along the following road traveling route, make the display unit display a traveling route from a current position of the vehicle to a nearest branch road in front in a moving direction along the following road traveling route and a moving direction on the nearest branch road along the following road traveling route.

According to the first aspect of the disclosure, when the driving mode is the following road autonomous driving mode, the autonomous driving device makes the display unit display the traveling route to the nearest branch road in front in the moving direction and the moving direction on the nearest branch road. With this, when where the driving mode is the following road autonomous driving mode, an occupant of the vehicle can ascertain how the vehicle travels (in which direction the vehicle moves) on the branch road by viewing the display unit.

In the autonomous driving device according to the first aspect of the disclosure, the electronic control unit may be configured to, when where the vehicle arrives at the destination during traveling in the destination setting type autonomous driving mode, select, as the driving mode, the following road autonomous driving mode in place of the destination setting type autonomous driving mode. According to the first aspect of the disclosure, the vehicle continues to travel in the following road autonomous driving mode after arriving at the destination during traveling in the destination setting type autonomous driving mode. At this time, when the driving mode is switched from the destination setting type autonomous driving mode to the following road autonomous driving mode, the traveling route to the nearest branch road in front in the moving direction and the moving direction on the nearest branch road are displayed on the display unit. With this, even when the driving mode is switched to the following road autonomous driving mode after the vehicle arrives at the destination, an occupant of the vehicle can ascertain how the vehicle travels on the branch road.

In the autonomous driving device according to the first aspect of the disclosure, the electronic control unit may be configured to further detect the presence or absence of an occupant of the vehicle. In a state in which the electronic control unit detects that the occupant is in the vehicle, when the vehicle arrives at the destination during traveling in the destination setting type autonomous driving mode, the electronic control unit may be configured to select, as the driving mode, the following road autonomous driving mode in place of the destination setting type autonomous driving mode. In a state in which the electronic control unit detects that no occupant is in the vehicle, when the vehicle arrives at the destination during traveling in the destination setting type autonomous driving mode, the electronic control unit may be configured to stop the vehicle. According to the first aspect of the disclosure, it is possible to make (control) a traveling state of the vehicle after the vehicle arrives at the destination during traveling in the destination setting type autonomous driving mode different according to the presence or absence of the occupant of the vehicle. With this, the autonomous driving device can perform autonomous driving control reflecting an intention of the destination being set in a case where the vehicle is manned and an intention of the destination being set in a case where the vehicle is unmanned.

The autonomous driving device according to the first aspect of the disclosure may further include an input unit configured to receive an input operation from an occupant. The electronic control unit may be configured to, when a distance to the destination is within a predetermined distance while the vehicle is traveling in the destination setting type autonomous driving mode, further give notification to the effect that the driving mode is switched from the destination setting type autonomous driving mode to the following road autonomous driving mode when the vehicle arrives at the destination. The electronic control unit may be configured to select, as the driving mode when the vehicle arrives at the destination, the following road autonomous driving mode in place of the destination setting type autonomous driving mode based on a reception result in the input unit after the notification is performed. According to the first aspect of the disclosure, the autonomous driving device can perform autonomous driving control reflecting an intention of the occupant after the vehicle arrives at the destination.

The autonomous driving device according to the first aspect of the disclosure may further include a GPS receiver configured to measure a position of the vehicle and transmits positional information of the vehicle to the electronic control unit, and a map database configured to store map information. The electronic control unit may be configured to recognize a position of the vehicle on the map based on the positional information of the vehicle and the map information.

A second aspect of the disclosure relates to an autonomous driving control method that switches a driving mode of a vehicle with an autonomous driving device including an electronic control unit. The driving mode includes a destination setting type autonomous driving mode in which the vehicle is made (controlled) to travel using a traveling plan generated based on a target traveling route to a destination set in advance, and a following road autonomous driving mode in which, when a destination is not set in advance, the vehicle is made (controlled) to travel using a traveling plan generated based on a following road traveling route set along a road, on which the vehicle is traveling. The autonomous driving control method includes, selecting, by the electronic control unit, as the driving mode, the destination setting type autonomous driving mode or the following road autonomous driving mode based on a prescribed condition, controlling, by the electronic control unit, traveling of the vehicle based on the traveling plan of the selected driving mode, and, making (controlling), by the electronic control unit, a display unit configured to present information display a traveling route along the target traveling route when the driving mode is the destination setting type autonomous driving mode, and making, by the electronic control unit, the display unit display a traveling route along the following road traveling route when the driving mode is the following road autonomous driving mode. When the display unit is made to display the traveling route along the following road traveling route, the display unit is made, by the electronic control unit, to display a traveling route from a current position of the vehicle to a nearest branch road in front in a moving direction along the following road traveling route and a moving direction on the nearest branch road along the following road traveling route.

In the autonomous driving control method according to the second aspect of the disclosure, when the vehicle arrives at the destination during traveling in the destination setting type autonomous driving mode, the following road autonomous driving mode may be selected, by the electronic control unit, as the driving mode in place of the destination setting type autonomous driving mode.

The autonomous driving control method according to the second aspect of the disclosure may further include, detecting, by the electronic control unit, the presence or absence of an occupant of the vehicle. In a case where the occupant in the vehicle is detected by the by the electronic control unit when the vehicle arrives at the destination during traveling in the destination setting type autonomous driving mode, the following road autonomous driving mode may be selected, by the electronic control unit, as the driving mode in place of the destination setting type autonomous driving mode. In a case where no occupant is in the vehicle is detected by the electronic control unit when the vehicle arrives at the destination during traveling in the destination setting type autonomous driving mode, the vehicle may be stopped by the electronic control unit.

The autonomous driving control method according to the second aspect of the disclosure may further include, when a distance to the destination is within a predetermined distance while the vehicle is traveling in the destination setting type autonomous driving mode, giving notification to the effect that the driving mode is switched from the destination setting type autonomous driving mode to the following road autonomous driving mode when the vehicle arrives at the destination by the electronic control unit, and selecting, by the electronic control unit, as the driving mode when the vehicle arrives at the destination, the following road autonomous driving mode in place of the destination setting type autonomous driving mode based on a reception result in an input unit configured to receive an input operation from an occupant after the notification is performed.

According to the aspects of the disclosure, in a case where the driving mode of the vehicle is the following road autonomous driving mode, an occupant can ascertain how the vehicle travels on a branch road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
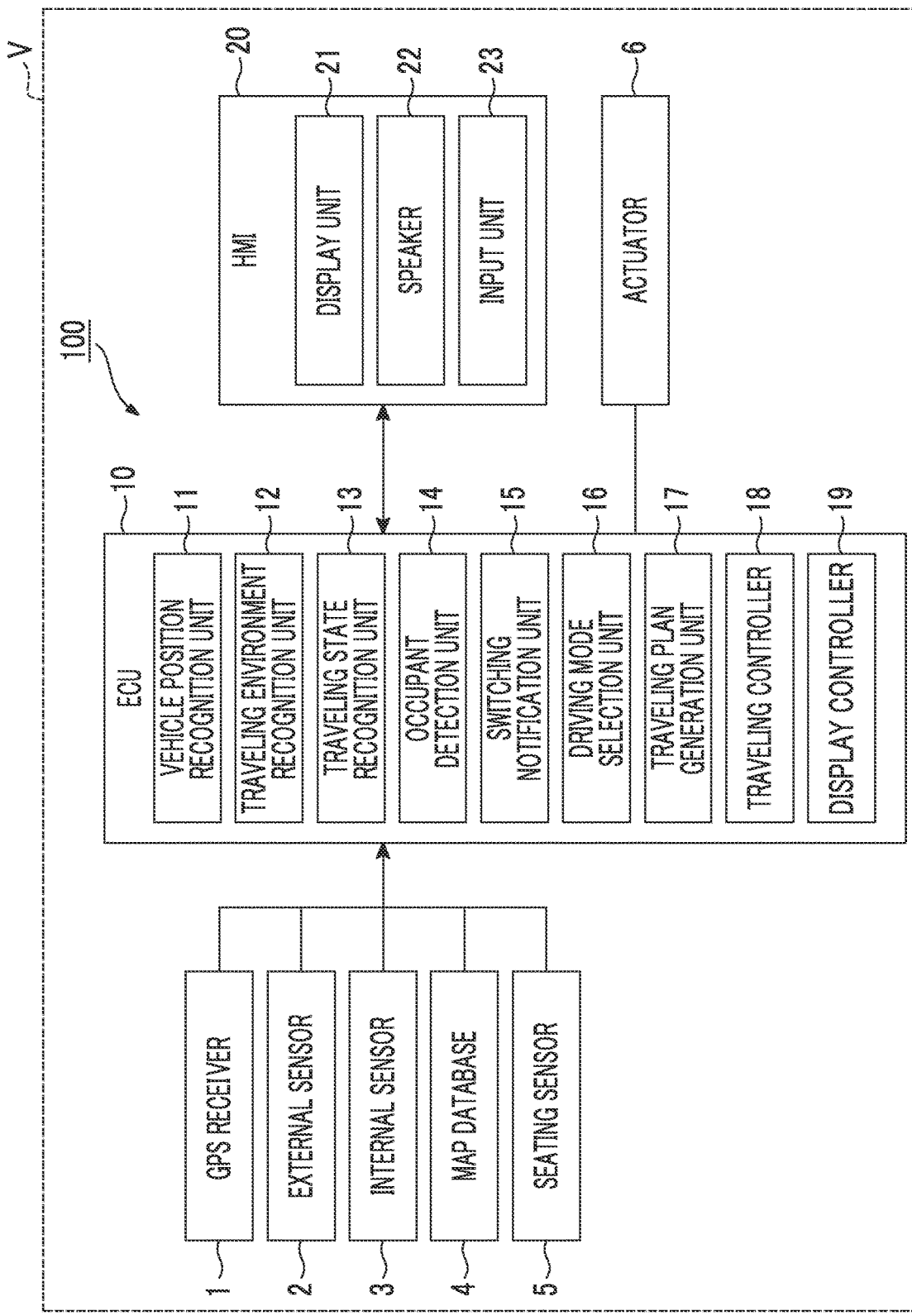
FIG. 1 is a diagram showing the schematic configuration of an autonomous driving device according to an embodiment.

Hereinafter, an embodiment of the disclosure will be described referring to the drawings. In the description of the drawings, the same elements are represented by the same reference numerals, and overlapping description will not be repeated.

An autonomous driving device 100 shown in FIG. 1 is mounted in a vehicle V, such as a passenger vehicle, and controls traveling of the vehicle V. The autonomous driving device 100 is configured to switch a driving mode of the vehicle V to at least a destination setting type autonomous driving mode and a following road autonomous driving mode.

The destination setting type autonomous driving mode is a mode in which a destination is set in advance and the vehicle V is controlled to travel to the destination set in advance. The following road autonomous driving mode is a mode in which a destination is not set in advance, and the vehicle V is controlled to travel along a road on which the vehicle V is traveling. In each of the destination setting type autonomous driving mode and the following road autonomous driving mode, a driver does not need to perform a driving operation, and the vehicle V travels autonomously.

In the embodiment, in a case where the vehicle V arrives at a destination during traveling in the destination setting type autonomous driving mode, the autonomous driving device 100 switches the driving mode of the vehicle V from the destination setting type autonomous driving mode to the following road autonomous driving mode or stops the vehicle V near the destination according to an intention of an occupant of the vehicle V.

Configuration of Autonomous Driving Device

As shown in FIG. 1, the autonomous driving device 100 includes an electronic control unit (ECU) 10 that integrally controls a system. The ECU 10 is an electronic control unit having a central processing unit (CPU), a read only memory (ROM), a random access memory (RAM), a controller area network (CAN) communication circuit, and the like. In the ECU 10, for example, a program that is stored in the ROM is loaded on the RAM, and the program loaded on the RAM is executed by the CPU, thereby realizing various functions. The ECU 10 may be constituted of a plurality of electronic control units.

A GPS receiver 1, an external sensor 2, an internal sensor 3, a map database 4, a seating sensor 5, an actuator 6, and a human machine interface (HMI) 20 are connected to the ECU 10.

The GPS receiver 1 measures a position (for example, a latitude and longitude of the vehicle) of the vehicle by receiving signals from three or more GPS satellites. The GPS receiver 1 transmits the measured positional information of the vehicle to the ECU 10.

The external sensor 2 is a detection device that detects circumstances around the vehicle. The external sensor 2 includes at least one of a camera and a radar sensor.

The camera is an imaging device that images external circumstances of the vehicle. The camera is provided on a rear side of a windshield of the vehicle. The camera transmits imaging information relating to the external circumstances of the vehicle to the ECU 10. The camera may be a monocular camera or a stereo camera. The stereo camera has two imaging units disposed so as to reproduce binocular parallax. Imaging information of the stereo camera includes information in a depth direction.

The radar sensor detects obstacles around the vehicle using electric waves (for example, millimeter waves) or light. The radar sensor transmits electric waves or light around the vehicle and receives electric waves or light reflected from obstacles to detect obstacles. The radar sensor transmits detected obstacle information to the ECU 10. Examples of the obstacles include movable obstacles, such as pedestrians, bicycles, and other vehicles, in addition to fixed obstacles, such as guardrails and buildings.

The internal sensor 3 is a detection device that detects a traveling state of the vehicle. The internal sensor 3 includes a vehicle speed sensor, an acceleration sensor, and a yaw rate sensor. The vehicle speed sensor is a detector that detects a speed of the vehicle. As the vehicle speed sensor, for example, a wheel speed sensor that is provided in a wheel of the vehicle, a drive shaft configured to rotate integrally with the wheel, or the like, and detects a rotation speed of the wheel is used. The vehicle speed sensor transmits detected vehicle speed information (wheel speed information) to the ECU 10.

The acceleration sensor is a detector that detects an acceleration of the vehicle. The acceleration sensor includes, for example, a front-rear acceleration sensor that detects an acceleration of the vehicle in a front-rear direction, and a lateral acceleration sensor that detects a lateral acceleration of the vehicle. For example, the acceleration sensor transmits acceleration information of the vehicle to the ECU 10. The yaw rate sensor is a detector that detects a yaw rate (rotational angular velocity) of the center of gravity of the vehicle around a vertical axis. As the yaw rate sensor, for example, a gyro sensor can be used. The yaw rate sensor transmits detected yaw rate information of the vehicle to the ECU 10.

The map database 4 is a database that stores map information. For example, the map database 4 is formed in a hard disk drive (HDD) mounted in the vehicle. The map information includes positional information of roads, information (for example, classifications of curves and straight portions, curvatures of curves, and the like) of road shapes, positional information of intersections and branch points, positional information of structures, and the like. The map information may include traffic regulation information, such as a legal limit speed associated with positional information. The map database 4 may be stored in a computer of a facility, such as a management center that is communicable with the vehicle.

The seating sensor 5 is a sensor that detects seating of an occupant of the vehicle V. As the seating sensor 5, a pressure sensor provided in each seat of the vehicle V can be used. The seating sensor 5 transmits a detection result to the ECU 10.

The actuator 6 is a device that performs traveling control of the vehicle. The actuator 6 includes at least a throttle actuator, a brake actuator, and a steering actuator. The throttle actuator controls the amount of air (throttle valve opening degree) supplied to an engine according to a control signal from the ECU 10, and controls drive power of the vehicle. In a case where the vehicle is a hybrid vehicle, in addition to the amount of air supplied to the engine, a control signal from the ECU 10 is input to a motor as a power source and the drive power is controlled. In a case where the vehicle is an electric vehicle, a control signal from the ECU 10 is input to a motor as a power source, and the drive power is controlled. In both cases, the motor as a power source constitutes the actuator 6.

The brake actuator controls a brake system according to a control signal from the ECU 10, and controls braking force that is given to the wheels of the vehicle. As the brake system, for example, a hydraulic brake system can be used. The steering actuator controls the drive of an assist motor configured to control steering torque in an electric power steering system according to a control signal from the ECU 10. With this, the steering actuator controls the steering torque of the vehicle.

The HMI 20 is an interface that is provided to perform input and output of information between the autonomous driving device 100 and an occupant. The HMI 20 includes a display unit 21, a speaker 22, an input unit 23, and the like. The display unit 21 presents (outputs an image) information to an occupant of the vehicle V according to a control signal from the ECU 10. The speaker 22 outputs sound according to a control signal from the ECU 10. The input unit 23 receives an input operation from an occupant of the vehicle V. The input unit 23 may be a touch panel disposed to overlap a screen of the display unit 21 or may be a switch or the like provided at a position different from the display unit 21.

Next, the functional configuration of the ECU 10 will be described. The ECU 10 has a vehicle position recognition unit 11, a traveling environment recognition unit 12, a traveling state recognition unit 13, an occupant detection unit 14, a switching notification unit 15, a driving mode selection unit 16, a traveling plan generation unit 17, a traveling controller 18, and a display controller 19. A part of the functions of the ECU 10 may be executed in an external server that is communicable with the vehicle V.

The vehicle position recognition unit 11 recognizes the position of the vehicle V on a map based on the positional information of the GPS receiver 1 and the map information of the map database 4. The vehicle position recognition unit 11 recognizes a position of the vehicle using positional information of fixed obstacles, such as poles, included in the map information of the map database 4 and the detection result of the external sensor 2 with a simultaneous localization and mapping (SLAM) technique. The vehicle position recognition unit 11 may recognize the position of the vehicle on the map using other known techniques.

The traveling environment recognition unit 12 recognizes a traveling environment around the vehicle V based on the detection result of the external sensor 2. The traveling environment includes positions of obstacles with respect to the vehicle V, relative speeds of obstacles with respect to the vehicle V, moving directions of obstacles with respect to the vehicle V, and the like. The traveling environment recognition unit 12 recognizes the traveling environment of the vehicle V based on captured images of the camera and the obstacle information of the radar sensor using a known method.

The traveling state recognition unit 13 recognizes a traveling state of the vehicle V based on the detection result of the internal sensor 3. The traveling state includes a vehicle speed of the vehicle V, an acceleration of the vehicle V, and a yaw rate of the vehicle V. Specifically, the traveling state recognition unit 13 recognizes the vehicle speed of the vehicle V based on the vehicle speed information of the vehicle speed sensor. The traveling state recognition unit 13 recognizes the acceleration of the vehicle V based on the acceleration information of the acceleration sensor. The traveling state recognition unit 13 recognizes a direction of the vehicle V based on the yaw rate information of the yaw rate sensor.

The occupant detection unit 14 detects the presence or absence of an occupant of the vehicle V based on the detection result of the seating sensor 5. The occupant detection unit 14 detects that an occupant is in the vehicle in a case where the seating sensor 5 detects the seating of the occupant, and detects that an occupant is not in the vehicle in a case where seating is not detected.

In a case where the vehicle V arrives near a destination during traveling in the destination setting type autonomous driving mode, the switching notification unit 15 notifies the occupant of the vehicle V to the effect that the driving mode is switched from the destination setting type autonomous driving mode to the following road autonomous driving mode when the vehicle V arrives at the destination. The switching notification unit 15 can perform the notification using at least one of the display unit 21 and the speaker 22 of the HMI 20. The switching notification unit 15 can determine whether or not the vehicle V arrives at a destination based on the map information, a destination set in advance to make the vehicle V travel in the destination setting type autonomous driving mode, the position of the vehicle V recognized by the vehicle position recognition unit 11, or the like. The term "near a destination" refers to an area where a distance to the destination set in advance to make the vehicle V travel in the destination setting type autonomous driving mode is within a predetermined distance. That is, in a case where the distance to the destination is within the predetermined distance, the switching notification unit 15 performs the notification.

The driving mode selection unit 16 selects the destination setting type autonomous driving mode as the driving mode, for example, in a case where a driver or the like of the vehicle V gives an instruction to start autonomous driving in the destination setting type autonomous driving mode.

The driving mode selection unit 16 selects either of the destination setting type autonomous driving mode or the following road autonomous driving mode based on a prescribed condition. Specifically, in a state in which the occupant detection unit 14 detects that an occupant is in the vehicle, in a case where the vehicle V arrives at the destination during traveling in the destination setting type autonomous driving mode, the driving mode selection unit 16 selects, as the driving mode, the following road autonomous driving mode in place of the destination setting type autonomous driving mode. The driving mode selection unit 16 can determine whether or not the vehicle arrives at the destination based on the map information, the destination set in advance, the position of the vehicle V recognized by the vehicle position recognition unit 11, or the like.

The driving mode selection unit 16 performs the selection of the driving mode based on an intention of the occupant of the vehicle V. Specifically, the driving mode selection unit 16 selects, as the driving mode in a case where the vehicle V arrives at the destination, the following road autonomous driving mode in place of the destination setting type autonomous driving mode based on the reception result in the input unit 23 after the switching notification unit 15 performs the notification.

In the embodiment, in a case where the input unit 23 does not receive an input operation from an occupant, the driving mode selection unit 16 performs the selection (switching) of the driving mode. In this way, in a case where the input unit 23 does not receive an input operation from an occupant, the driving mode selection unit 16 selects the following road autonomous driving mode as the driving mode after the vehicle V arrives at the destination set in advance during traveling in the destination setting type autonomous driving mode. The disclosure is not limited thereto, the driving mode selection unit 16 may perform the selection of the driving mode in a case where the input unit 23 receives an input operation from an occupant.

The traveling plan generation unit 17 generates a traveling plan for making the vehicle V travel in the destination setting type autonomous driving mode. Specifically, the traveling plan generation unit 17 sets a target traveling route of the vehicle V to the destination based on the destination set in advance, the position of the vehicle V on the map recognized by the vehicle position recognition unit 11, and the map information of the map database 4. The destination may be a destination set by the driver of the vehicle V or may be a destination set automatically by the autonomous driving device 100 using a known method. The target traveling route is a route on which the vehicle V travels autonomously in a case where the driving mode of the vehicle V is the destination setting type autonomous driving mode.

The traveling plan generation unit 17 generates a traveling plan of the vehicle V for making the vehicle V travel in the destination setting type autonomous driving mode based on the target traveling route, the map information of the map database 4, the traveling environment of the vehicle recognized by the traveling environment recognition unit 12, and the traveling state of the vehicle recognized by the traveling state recognition unit 13. The traveling plan includes a control target value of the vehicle V according to a position of the vehicle V on the target traveling route. The position on the target traveling route is a position on the map in an extension direction of the target traveling route. The position on the target traveling route means a set vertical position set at every predetermined interval (for example, 1 m) in the extension direction of the target traveling route. The control target value is a value that becomes a control target of the vehicle V in the traveling plan. The control target value is set in association with each set vertical position on the target traveling route. The traveling plan generation unit 17 sets the set vertical position at the predetermined interval on the target traveling route and sets the control target value (for example, a target horizontal position and a target vehicle speed) for each set vertical position, thereby generating the traveling plan. The set vertical position and the target horizontal position may be combined and set as one position coordinates. The set vertical position and the target horizontal position mean information of a vertical position and information of a horizontal position that are set as a target in the traveling plan.

The traveling plan generation unit 17 generates a traveling plan for making the vehicle V travel in the following road autonomous driving mode, in addition to the traveling plan for making the vehicle V travel in the destination setting type autonomous driving mode. Specifically, the traveling plan generation unit 17 sets a following road traveling route for traveling along a road, on which the vehicle V is traveling, in a case where a destination is not set in advance. The following road traveling route is a route on which the vehicle V travels autonomously in a case where the driving mode of the vehicle V is the following road autonomous driving mode.

The traveling plan generation unit 17 sets the following road traveling route according to a prescribed rule including a determination criterion or the like in a case of determining in which direction the vehicle moves on a branch road. For example, the traveling plan generation unit 17 can set the following road traveling route using a known method like a following road traveling route in "DRIVING ASSISTANCE DEVICE" described in Japanese Patent No. 5382218 (JP 5382218 B) (WO 2011/158347) or "AUTONOMOUS DRIVING DEVICE" described in Japanese Unexamined Patent Application Publication No. 2011-162132 (JP 2011-162132 A).

The traveling plan generation unit 17 generates a traveling plan of the vehicle V for making the vehicle V travel in the following road autonomous driving mode based on the following road traveling route, the map information of the map database 4, the traveling environment of the vehicle recognized by the traveling environment recognition unit 12, and the traveling state of the vehicle recognized by the traveling state recognition unit 13. As in a case of the traveling plan of the destination setting type autonomous driving mode, the traveling plan includes the control target value of the vehicle V according to the position on the following road traveling route of the vehicle V.

The traveling controller 18 performs control of the vehicle according to the driving mode of the vehicle V selected by the driving mode selection unit 16. The traveling controller 18 transmits a control signal to the actuator 6, thereby controlling traveling of the vehicle V. In a case where the driving mode of the vehicle V is the destination setting type autonomous driving mode, the traveling controller 18 makes the vehicle V travel autonomously based on the traveling plan for making the vehicle V travel in the destination setting type autonomous driving mode generated by the traveling plan generation unit 17.

In a case where the driving mode of the vehicle V is the following road autonomous driving mode, the traveling controller 18 makes the vehicle V travel autonomously based on the traveling plan for making the vehicle V travel in the following road autonomous driving mode generated by the traveling plan generation unit 17. The traveling controller 18 performs autonomous driving in the destination setting type autonomous driving mode or autonomous driving in the following road autonomous driving mode using a known method.

In a state in which the occupant detection unit 14 detects that an occupant is not in the vehicle, in a case where the vehicle V arrives at the destination during traveling in the destination setting type autonomous driving mode, the traveling controller 18 stops the vehicle V. In a case where the input unit 23 receives an input operation from the occupant after the switching notification unit 15 performs notification to the effect that the driving mode is switched, the traveling controller 18 stops the vehicle V when the vehicle V arrives at the destination during traveling in the destination setting type autonomous driving mode. That is, a case where the occupant performs an input operation after the switching notification unit 15 performs notification to the effect that the driving mode is switched refers to a case where the occupant does not want traveling in the following road autonomous driving mode after the vehicle arrives at the destination during traveling in the destination setting type autonomous driving mode.

In a case of stopping the vehicle V, the traveling controller 18 stops the vehicle V at a stoppable position near the destination. The stoppable position near the destination is, for example, a place, such as a roadside, where traveling of other vehicles is not hindered. For example, the traveling controller 18 may determine a position where the vehicle V is stopped based on the recognition result of the traveling environment recognition unit 12, the map information of the map database 4, or the like, and may make the vehicle V travel to the stop position based on the recognition result of the traveling environment recognition unit 12, or the like. The traveling controller 18 can determine whether or not the vehicle arrives at the destination based on the map information, the destination set in advance, the position of the vehicle V recognized by the vehicle position recognition unit 11, or the like.

In a case where the driving mode selected by the driving mode selection unit 16 is the destination setting type autonomous driving mode, the display controller 19 makes the display unit 21 display a traveling route along the target traveling route. At this time, the display controller 19 makes the display unit 21 display a traveling route along the target traveling route on a scale set by the occupant of the vehicle V. The target traveling route to be displayed is the target traveling route set by the traveling plan generation unit 17 to generate the traveling plan for making the vehicle V travel in the destination setting type autonomous driving mode. In a case of making the display unit 21 display the traveling route along the target traveling route, the display controller 19 generates a display image based on the target traveling route generated by the traveling plan generation unit 17, the current position of the vehicle V recognized by the vehicle position recognition unit 11, the map information of the map database 4, and the like, and makes the display unit 21 display the generated display image.

Figure 2A:
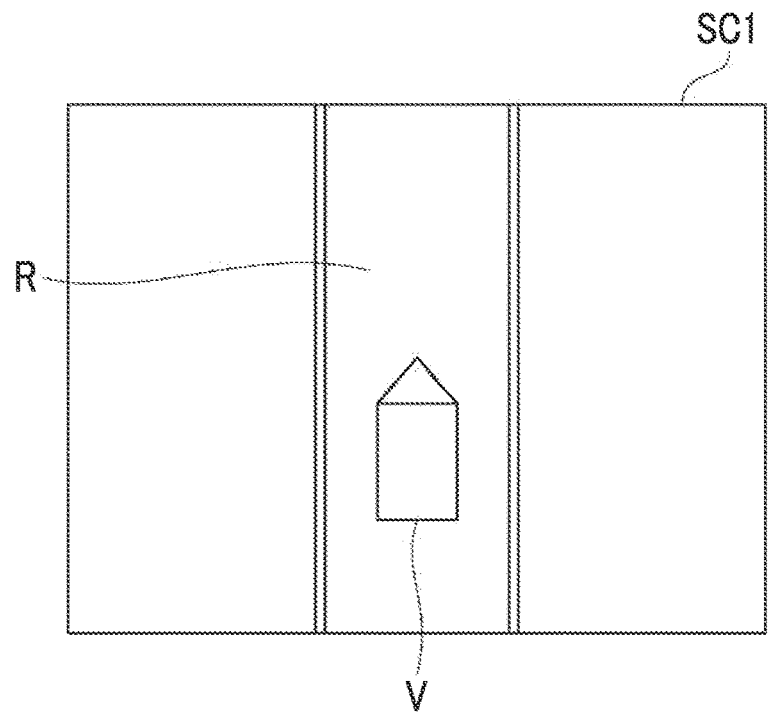
FIG. 2A is a diagram showing a display image example that is displayed on a display unit during traveling in a destination setting type autonomous driving mode.

For example, as shown in a display image example SC1 in FIG. 2A, the display controller 19 generates a display image including a traveling route R on which the vehicle V travels along the target traveling route, and the vehicle V, and makes the display unit 21 display the display image. A scale of display of the map of the display image is set to the scale set by the occupant of the vehicle V.

In a case where the driving mode selected by the driving mode selection unit 16 is the following road autonomous driving mode, the display controller 19 makes the display unit 21 display a traveling route along the following road traveling route. The following road traveling route to be displayed is the following road traveling route set by the traveling plan generation unit 17 to generate the traveling plan for making the vehicle V travel in the following road autonomous driving mode. In a case of making the display unit 21 display the traveling route along the following road traveling route, the display controller 19 generates a display image based on the following road traveling route generated by the traveling plan generation unit 17, the current position of the vehicle V recognized by the vehicle position recognition unit 11, the map information of the map database 4, and the like, and makes the display unit 21 display the generated display image.

In more detail, in a case of making the display unit 21 display the traveling route along the following road traveling route, the display controller 19 makes the display unit 21 display a display image including a traveling route from the current position of the vehicle V to a nearest branch road in front in a moving direction along the following road traveling route, and a moving direction on the nearest branch road along the following road traveling route.

In regard to the nearest branch road in front in the moving direction along the following road traveling route, even a branch road on which the vehicle moves straight in a case of traveling in the following road autonomous driving mode without turning right or left corresponds to the nearest branch road as long as the branch road is a branch road through which the vehicle passes first. That is, the nearest branch road is a branch road at which the vehicle V arrives first in a case where the vehicle V travels in the following road autonomous driving mode from the current position. Making the display unit 21 display a display image including the moving direction on the nearest branch road along the following road traveling route (making the display unit 21 display the moving direction along the following road traveling route) is making a direction, in which the vehicle V moves on the nearest branch road in a case where the vehicle V travels in the following road autonomous driving mode, be displayed to be ascertainable by the occupant of the vehicle V. For example, the display controller 19 can use an arrow indicating the direction, in which the vehicle V moves on the nearest branch road, as the moving direction on the nearest branch road along the following road traveling route, can generate a display image with the arrow overlapping the nearest branch road, and can make the display unit 21 display the display image.

Figure 2B:
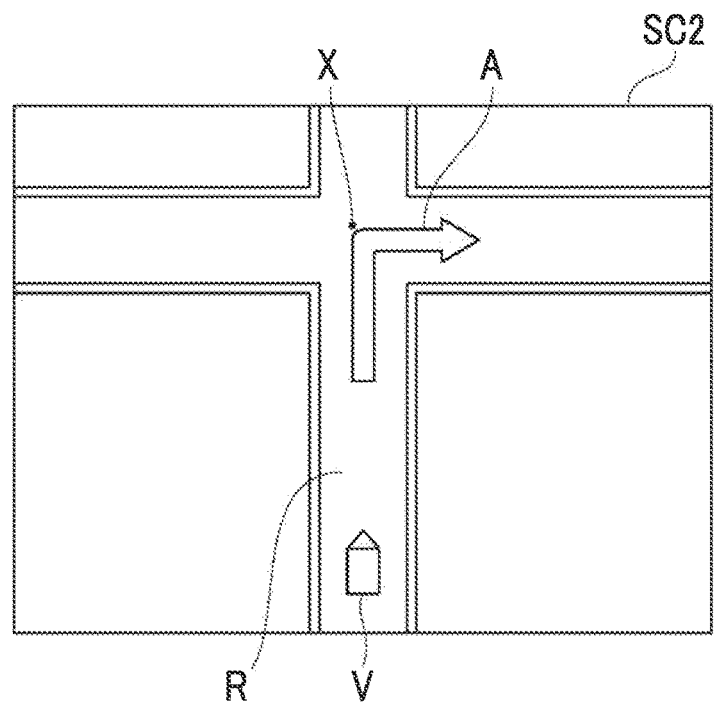
FIG. 2B is a diagram showing a display image example that is displayed on the display unit during traveling in a following road autonomous driving mode.

For example, as shown in a display image example SC2 of FIG. 2B, the display controller 19 generates a display image including a traveling route R on which the vehicle V travels along the following road traveling route, a nearest branch road X (in the example, an intersection), an arrow A indicating a moving direction of the vehicle V on the nearest branch road X, and the vehicle V, and makes the display unit 21 display the display image. In this way, in a case where the driving mode selected by the driving mode selection unit 16 is the following road autonomous driving mode, the display controller 19 adjusts the scale of display of the map of the display image so as to include the nearest branch road X along the following road traveling route.

Figure 3:
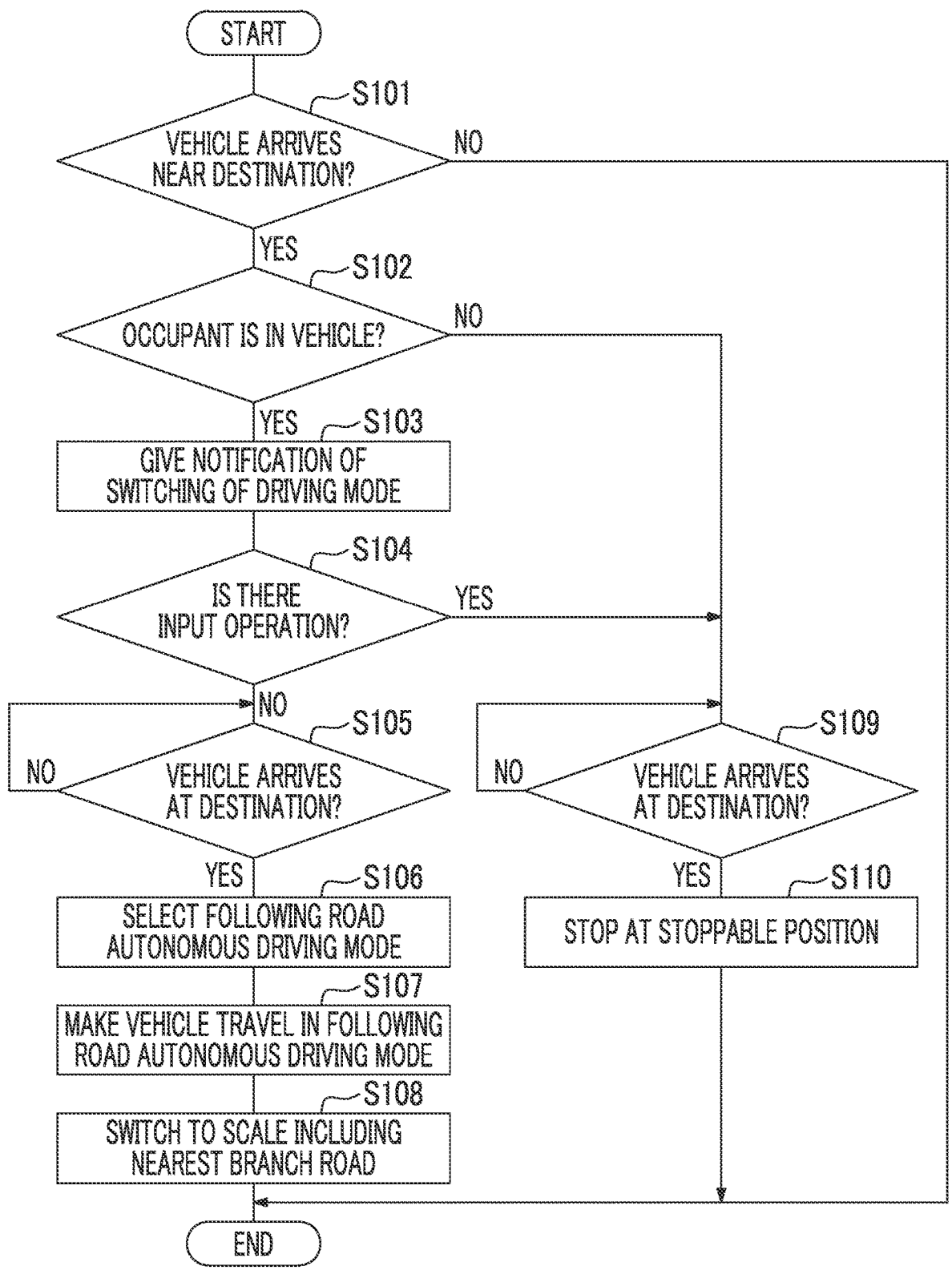
FIG. 3 is a flowchart showing a flow of processing for switching a driving mode and switching display during traveling in the destination setting type autonomous driving mode.

Next, a flow of processing that is performed by the ECU 10 in a case where the vehicle V arrives at the destination set in advance during traveling in the destination setting type autonomous driving mode will be described referring to a flowchart of the FIG. 3. The processing shown in FIG. 3 is started in a case where the driving mode of the vehicle V becomes the destination setting type autonomous driving mode, and is repeatedly performed at every predetermined time until the vehicle V arrives near the destination set in advance during traveling in the destination setting type autonomous driving mode. After the vehicle arrives near the destination and the processing of FIG. 3 reaches the end, the present processing ends.

As shown in FIG. 3, the switching notification unit 15 determines whether or not the vehicle V arrives near the destination set in advance in order to give notification to the effect that the driving mode is switched in a case where the vehicle V arrives near the destination (S101). In a case where the vehicle V does not arrive near the destination (S101: NO), the switching notification unit 15 starts the processing from S101 again after a predetermined time. In a case where the vehicle V arrives near the destination (S101: YES), the occupant detection unit 14 detects the presence or absence of an occupant of the vehicle V (S102). In a case where an occupant is in the vehicle (S102: YES), the switching notification unit 15 notifies the occupant of the vehicle V to the effect that the driving mode is switched from the destination setting type autonomous driving mode to the following road autonomous driving mode when the vehicle V arrives at the destination (S103).

The driving mode selection unit 16 and the traveling controller 18 determine whether or not the input unit 23 receives an input operation from the occupant of the vehicle V after the switching notification unit 15 performs the notification (S104). For example, the driving mode selection unit 16 and the traveling controller 18 determines whether or not the input unit 23 receives an input operation within a prescribed predetermined time after the switching notification unit 15 performs the notification. The prescribed predetermined time is set to a time until the vehicle V arrives at the destination after the switching notification unit 15 performs the notification. For example, the prescribed predetermined time may be set based on the speed of the vehicle V and the distance to the destination. In a case where the input unit 23 does not receive an input operation (S104: NO), the driving mode selection unit 16 determines whether or not the vehicle V arrives at the destination (S105). In a case where the vehicle V does not arrive at the destination (S105: NO), the driving mode selection unit 16 performs the processing of S105 again. In a case where the vehicle V arrives at the destination (S105: YES), the driving mode selection unit 16 selects the following road autonomous driving mode in place of the destination setting type autonomous driving mode (S106).

The traveling controller 18 makes the vehicle V travel in the following road autonomous driving mode in place of the destination setting type autonomous driving mode after the vehicle V arrives at the destination (S107). As shown in FIG. 2B, the display controller 19 switches the scale of the map displayed on the display unit 21 to include the nearest branch road X along the following road traveling route, and makes the display unit 21 display the traveling route to the nearest branch road X and the moving direction (arrow A) on the nearest branch road X (S108).

In a case where an occupant is not in the vehicle (S102: NO) or in a case where there is an input operation from the occupant (S104: YES), the traveling controller 18 determines whether or not the vehicle V arrives at the destination (S109). In a case where the vehicle V does not arrive at the destination (S109: NO), the traveling controller 18 performs the processing of S109 again. In a case where the vehicle V arrives at the destination (S109: YES), the traveling controller 18 stops the vehicle V at the stoppable position (S110).

The embodiment is configured as above, and in a case where the driving mode is the following road autonomous driving mode, as shown in FIG. 2B, the autonomous driving device 100 makes the display unit 21 display the traveling route to the nearest branch road X in front in the moving direction and the moving direction (arrow A) on the nearest branch road X. With this, in a case where the driving mode is the following road autonomous driving mode, the occupant of the vehicle V can ascertain how the vehicle V travels on the branch road by viewing the display unit 21.

After the vehicle V arrives at the destination during traveling in the destination setting type autonomous driving mode, the autonomous driving device 100 makes the vehicle V travel in the following road autonomous driving mode. At this time, in a case where the driving mode is switched from the destination setting type autonomous driving mode to the following road autonomous driving mode, as described above, the traveling route to the nearest branch road in front in the moving direction and the moving direction on the nearest branch road are displayed on the display unit 21. With this, even in a case where the driving mode is switched to the following road autonomous driving mode after the vehicle V arrives at the destination, the occupant of the vehicle V can ascertain how the vehicle V travels on the branch road.

In a case where an occupant is in the vehicle V, the driving mode selection unit 16 selects, as the driving mode, the following road autonomous driving mode in place of the destination setting type autonomous driving mode after the vehicle V arrives at the destination during traveling in the destination setting type autonomous driving mode. In a case where an occupant is not in the vehicle, the traveling controller 18 stops the vehicle V near the destination. In this case, it is possible to make the traveling state of the vehicle V after the vehicle V arrives at the destination during traveling in the destination setting type autonomous driving mode different according to the presence or absence of an occupant of the vehicle V. With this, the autonomous driving device 100 can perform autonomous driving control reflecting an intention of the destination being set in a case where the vehicle V is manned and an intention of the destination being set in a case where the vehicle V is unmanned.

For example, in a case of making the unmanned vehicle V travel to the destination in the destination setting type autonomous driving mode and delivering articles or the like, when the vehicle is made to travel along a road after arriving at the destination, it is not desirable because the vehicle is away from the destination. For this reason, in a case where the vehicle V is unmanned, there is a case where the vehicle V needs to be stopped. In contrast, in a case where the vehicle V is manned, and the set destination is an approximate area (an area having a certain size), there is a case where the vehicle V needs to be continued to travel along a road instead of stopping the vehicle V in a state in which accuracy as the destination is low. In this way, the autonomous driving device 100 can perform autonomous driving control reflecting an intention of the destination being set according to the presence or absence of an occupant of the vehicle V.

The driving mode selection unit 16 selects, as the driving mode after the vehicle arrives at the destination, the following road autonomous driving mode in place of the destination setting type autonomous driving mode based on the presence or absence of an input operation from the occupant after the switching notification unit 15 performs the notification. In this case, the autonomous driving device 100 can perform autonomous driving control reflecting an intention of the occupant after the vehicle arrives at the destination.

Although the embodiment of the disclosure has been described above, the disclosure is not limited to the embodiment. For example, in a case where the autonomous driving device 100 includes an in-vehicle camera that images the inside of the vehicle, the occupant detection unit 14 may detect the presence or absence of an occupant of the vehicle V based on a captured image of the in-vehicle camera. Detecting the presence or absence of an occupant from the captured image can be performed, for example, using a known image processing technique.

The switching notification unit 15 may give notification to an occupant of the vehicle V in advance before the vehicle V arrives near the destination during traveling in the destination setting type autonomous driving mode. In the switching notification unit 15, the notification to the effect that the driving mode is switched may be performed merely in a case where the occupant detection unit 14 detects that an occupant is in the vehicle.

In a case where the vehicle V travels from the destination in the following road autonomous driving mode before the vehicle V arrives at the destination during traveling in the destination setting type autonomous driving mode, the traveling controller 18 may make the display unit 21 display the traveling route from the destination to the nearest branch road in front in the moving direction and the moving direction on the nearest branch road. Then, the driving mode selection unit 16 may select the driving mode after the vehicle arrives at the destination according to an input operation from the occupant. In this case, the occupant can confirm a traveling route in a case where the vehicle travels in the following road autonomous driving mode after arriving at the destination in advance, and can determine whether or not the driving mode is switched to the following road autonomous driving mode after the vehicle arrives at the destination in advance.

The disclosure is not limited to a configuration in which the driving mode selection unit 16 selects the driving mode after the vehicle arrives at the destination according to the presence or absence of an input operation of the occupant after the switching notification unit 15 performs the notification. For example, the driving mode selection unit 16 may select, as the driving mode, the following road autonomous driving mode in place of the destination setting type autonomous driving mode after the vehicle arrives at the destination, regardless of the presence or absence of notification or an input operation.

The disclosure is not limited to a configuration in which the driving mode selection unit 16 selects the driving mode after the vehicle arrives at the destination according to the presence or absence of an occupant. For example, the driving mode selection unit 16 may select, as the driving mode, the following road autonomous driving mode in place of the destination setting type autonomous driving mode after the vehicle arrives at the destination, regardless of the presence or absence of an occupant.

The disclosure is not limited to a configuration in which, in a case where the vehicle V arrives at the destination during traveling in the destination setting type autonomous driving mode, the driving mode selection unit 16 selects, as the driving mode, the following road autonomous driving mode in place of the destination setting type autonomous driving mode. For example, the driving mode selection unit 16 may select the following road autonomous driving mode in place of the destination setting type autonomous driving mode based on a condition other than the condition that the vehicle arrives at the destination. As the condition other than the condition that the vehicle arrives at the destination, for example, an input operation to switch the driving mode from an occupant, or the like is exemplified.

What is claimed is:

1. A vehicle comprising:
    an electronic control unit programmed to:
        switch a driving mode of the vehicle, the driving mode including:
            (i) a first autonomous driving mode in which a destination is set in advance and the vehicle is controlled to travel using a traveling plan set in advance generated based on a target traveling route, and
            (ii) a second autonomous driving mode in which the traveling plan is not set in advance and the vehicle is controlled to travel along a road on which the vehicle is traveling,
        notify that the driving mode will be switched from the first autonomous driving mode to the second autonomous driving mode in advance before the vehicle arrives near the destination during traveling in the first autonomous driving mode; and
        when the driving mode is switched from the first autonomous driving mode to the second autonomous driving mode, notify that the driving mode is switched.

2. The vehicle according to claim 1, wherein the electronic control unit is further programmed to control traveling of the vehicle in the driving mode.

3. The vehicle according to claim 2, wherein the electronic control mode is further programmed to, after the vehicle arrives at the destination during traveling in the first autonomous driving mode, control the vehicle to travel in the second autonomous driving mode, and display the traveling route to a nearest branch road in a moving direction of the vehicle and the moving direction on the nearest branch road.

4. The vehicle according to claim 1, wherein the electronic control unit is further programmed to determine that the vehicle has arrived near the destination if a distance to the destination is within a predetermined distance while the vehicle is traveling in the first autonomous driving mode.

5. The vehicle according to claim 4, wherein the electronic control unit is further programmed to, based on a determination result that the vehicle is near the destination, detect whether an occupant is in the vehicle, and only in a case that the occupant is detected in the vehicle, notify that the driving mode will be switched from the first autonomous driving mode to the second autonomous driving mode in advance before the vehicle arrives near the destination during traveling in the first autonomous driving mode.

6. The vehicle according to claim 4, wherein the electronic control unit is further programmed to, after the notification that the driving mode will be switched from the first autonomous driving mode to the second autonomous driving mode in advance before the vehicle arrives near the destination during traveling in the first autonomous driving mode, detect whether an input operation from an occupant has been performed, and select the driving mode from among the first autonomous driving mode and the second autonomous driving mode, according to the input operation from the occupant.

7. The vehicle according to claim 4, further comprising an interface configured to perform input and output of notification of information between the electronic control unit and an occupant of the vehicle, wherein the interface includes a display and an input unit.

8. A method of controlling a vehicle comprising:
    switching a driving mode of the vehicle, the driving mode including:
        (i) a first autonomous driving mode in which a destination is set in advance and the vehicle is controlled to travel using a traveling plan set in advance generated based on a target traveling route, and
        (ii) a second autonomous driving mode in which the traveling plan is not set in advance and the vehicle is controlled to travel along a road on which the vehicle is traveling,
    notifying that the driving mode will be switched from the first autonomous driving mode to the second autonomous driving mode in advance before the vehicle arrives near the destination during traveling in the first autonomous driving mode; and
    when the driving mode is switched from the first autonomous driving mode to the second autonomous driving mode, notifying that the driving mode is switched.

9. The method according to claim 8, further comprising controlling traveling of the vehicle in the driving mode.

10. The method according to claim 8, further comprising determining that the vehicle has arrived near the destination if a distance to the destination is within a predetermined distance while the vehicle is traveling in the first autonomous driving mode.

11. The method according to claim 10, wherein, based on a determination result that the vehicle is near the destination, detecting whether an occupant is in the vehicle, and only in a case that the occupant is detected in the vehicle, notifying that the driving mode will be switched from the first autonomous driving mode to the second autonomous driving mode in advance before the vehicle arrives near the destination during traveling in the first autonomous driving mode.

12. The method according to claim 11, wherein, after the vehicle arrives at the destination during traveling in the first autonomous driving mode, controlling the vehicle to travel in the second autonomous driving mode, and displaying the traveling route to a nearest branch road in a moving direction of the vehicle and the moving direction on the nearest branch road.

13. The method according to claim 10, wherein, after the notification that the driving mode will be switched from the first autonomous driving mode to the second autonomous driving mode in advance before the vehicle arrives near the destination during traveling in the first autonomous driving mode, detecting whether an input operation from an occupant has been performed, and selecting the driving mode from among the first autonomous driving mode and the second autonomous driving mode, according to the input operation from the occupant.

14. The method according to claim 10, wherein the vehicle includes an interface for performing input and output of notification of information between the vehicle and an occupant of the vehicle, wherein the interface includes a display and an input unit.

* * * * *